United States Patent
Kilambi et al.

(10) Patent No.: US 10,841,033 B2
(45) Date of Patent: Nov. 17, 2020

(54) UNDER-SAMPLING BASED RECEIVER ARCHITECTURE FOR WIRELESS COMMUNICATIONS SYSTEMS

(71) Applicant: HUAWEI TECHNOLOGIES CO., LTD., Shenzhen, Guangdong (CN)

(72) Inventors: Sai Mohan Kilambi, Nepean (CA); David Neal Wessel, Kanata (CA); Lan Hu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/290,035

(22) Filed: Mar. 1, 2019

(65) Prior Publication Data

US 2020/0280384 A1    Sep. 3, 2020

(51) Int. Cl.
*H04J 13/00* (2011.01)
*H04J 13/18* (2011.01)
*H04J 13/12* (2011.01)
*H04L 27/26* (2006.01)

(52) U.S. Cl.
CPC .......... *H04J 13/004* (2013.01); *H04J 13/12* (2013.01); *H04J 13/18* (2013.01); *H04L 27/2649* (2013.01)

(58) Field of Classification Search
CPC .......... H04J 13/004; H04J 13/18; H04J 13/12; H04L 27/2649; H03M 3/496; H03M 3/498; H03M 3/50; H03M 13/00; H03M 13/37; H03M 7/3004
See application file for complete search history.

(56) References Cited

U.S. PATENT DOCUMENTS

| | | | |
|---|---|---|---|
| 9,575,105 B1* | 2/2017 | Witt | A61B 5/0531 |
| 9,996,786 B1* | 6/2018 | Mendel | H04W 4/80 |
| 2004/0184565 A1 | 9/2004 | Beadle et al. | |
| 2005/0281318 A1* | 12/2005 | Neugebauer | H04B 1/7075 375/134 |
| 2010/0091688 A1* | 4/2010 | Staszewski | H04L 5/06 370/277 |

(Continued)

FOREIGN PATENT DOCUMENTS

CN    107547097 A    1/2018

OTHER PUBLICATIONS

International Search Report and Written Opinion of PCT/CN2020/077328; Xiaowei Chen; dated May 27, 2020.

*Primary Examiner* — Mohamed A Kamara
(74) *Attorney, Agent, or Firm* — BCF LLP

(57) ABSTRACT

The disclosed systems, structures, and methods are directed to a wireless receiver. The configurations presented herein employ a structure operative to receive a plurality of analog signals, a signal encoding module configured to encode the plurality of received analog signals into a single encoded analog composite signal based on a coding scheme, a plurality of analog-to-digital converters operative to sample the single encoded analog composite signal and generate digital composite signals representatives of the single encoded analog signal. In addition, a signal decoding module configured to decode the digital composite signals based on the coding scheme in an interleaving manner and to output digital signals corresponding to the received plurality of analog signals containing the desired information content.

19 Claims, 13 Drawing Sheets

(56) References Cited

U.S. PATENT DOCUMENTS

2011/0007859 A1\* 1/2011 Ueda .................... H03L 7/18
                                                    375/376
2016/0315631 A1\* 10/2016 Kipnis ................... H03M 1/12
2017/0372102 A1   12/2017 Knoblauch
2019/0052306 A1    2/2019 Goh et al.
2019/0379455 A1\* 12/2019 Wang .................... H03M 3/42

\* cited by examiner

US 10,841,033 B2

UNDER-SAMPLING BASED RECEIVER ARCHITECTURE FOR WIRELESS COMMUNICATIONS SYSTEMS

CROSS-REFERENCE TO RELATED APPLICATIONS

This is the first application filed for the instantly disclosed technology.

FIELD OF THE INVENTION

The present invention generally relates to the field of wireless communication system and, in particular, to a wireless communication receiver employing under sampling techniques to provide reduced clock rate and power consumption for efficient use of hardware and software processing resources.

BACKGROUND

Certain wireless communication systems are configured to receive multiple analog data signals that have been previously encoded and modulated. These multiple analog data signals may then be combined, at a receiver, using a code having a higher frequency rate than the rate at which the analog data signals were modulated. This combination of a plurality of analog data signals yields an output signal that is spread across a wide bandwidth. The use of high code rates to spread the data signals enables the sharing of receiver hardware resources by combining multiple input signals to a single signal before being sampled by analog-to-digital (ADC) converter, while also providing a greater resistance to interference and increased reliability (e.g., lower error vector magnitude (EVM) values).

However, it will be appreciated that the decoding operations of these high code rate signals presents certain challenges to wireless receiver systems. Namely, receiver systems need to employ hardware, software, and firmware elements that are capable of operating at higher speeds to properly process the high code rate signals.

These challenges may be exacerbated by certain proposed enhancements to existing wireless communication systems as well as next-generation wireless communication designs. Such enhancements and designs include the deployment of high sampling rate ADC to sample high code rate signals. Such enhancements and designs potentially strain the receiver hardware and software processing resources.

SUMMARY

An object of the present disclosure is to provide a wireless receiver for processing analog signals. The disclosure presented herein employs a structure operative to receive a plurality of analog signals. A signal encoding module is to encode a plurality of received analog signals into a single encoded analog composite signal in accordance with a coding scheme having a code rate $F_c$. A plurality of analog-to-digital converters configured to sample the single encoded analog composite signal and generate a plurality of digital composite signals representative of the single encoded analog signal, wherein the plurality of analog-to-digital converters operates at a sampling rate lower than the code rate $F_c$. A signal decoding module configured to decode each of the plurality of digital composite signals, based on the coding scheme, to output a plurality of digital signals containing the desired information content of the received plurality of analog signals.

In accordance with other aspects of the present disclosure, the receiver further includes a spread code generation module operative to generate the coding scheme and supplying the code scheme to the signal encoding module and signal decoding module, wherein the coding scheme is a set of orthogonal codes.

In accordance with other aspects of the present disclosure, the receiver wherein the plurality of analog-to-digital converters are based on delta-sigma modulators and further includes a noise transfer function generator to shape away the quantization noise. The plurality of analog-to-digital converters operates to sample the single encoded analog composite signal at a sampling rate of $$\frac{F_c}{n},$$

wherein $F_c$ is the code rate and n is number of codes in the coding scheme.

In accordance with other aspects of the present disclosure, the receiver further includes a multi-phase clock generator operative to generate a plurality of phase-shifted clocks and supplying the phase-shifted clocks to the under-sampling analog-to-digital conversion module.

In accordance with other aspects of the present disclosure, the receiver architecture wherein the plurality of analog-to-digital converters operates at a clock frequency of $$\frac{F_c}{n} + k\frac{2\pi}{n},$$

$F_c$ is the code rate, n is number of codes in the coding scheme and k ranges from 0 to n−1.

In accordance with other aspects of the present disclosure, the receiver architecture wherein signal decoding module decode the plurality of digital composite signals in an interleaved manner.

In accordance with other aspects of the present disclosure, there is provided a method of processing wireless received signals. The disclosure presented herein operates to receive a plurality of analog signals containing desired information content and encodes the plurality of received analog signals into a single encoded analog composite signal in accordance with a coding scheme having a code rate $F_c$. The single encoded analog composite signal is sampled to generate a plurality of digital composite signals representative of the single encoded analog signal, wherein the sampling rate is lower than the code rate $F_c$. The digital composite signals are decoded in accordance with the coding scheme to output a plurality of digital signals containing the desired information content of the received plurality of analog signals.

In accordance with other aspects of the present disclosure, the method of processing signals further includes generating a coding wherein the coding scheme is a set of orthogonal codes.

In accordance with other aspects of the present disclosure, the method of processing signals further includes a noise transfer function to shape away quantization noise.

In accordance with other aspects of the present disclosure, the method of processing signals wherein sampling of the single encoded analog composite signal is performed at a sampling rate of $$\frac{F_c}{n},$$

wherein $F_c$ is the code rate and n is number of codes in the coding scheme.

In accordance with other aspects of the present disclosure, the method of processing signals further includes a method to generate a plurality of phase-shifted clocks, wherein the analog-to-digital conversion is performed at a clock frequency of $$\frac{F_c}{n} + k\frac{2\pi}{n},$$

wherein Fc is the code rate, n is number of codes in the coding scheme and k ranges from 0 to n−1.

In accordance with other aspects of the present disclosure, the method of processing signals wherein decoding of the plurality of digital composite signals to generate the plurality of digital signals is performed in an interleaving manner.

BRIEF DESCRIPTION OF THE FIGURES

The features and advantages of the present disclosure will become apparent from the following detailed description, taken in combination with the appended drawings, in which.

Figure 1:
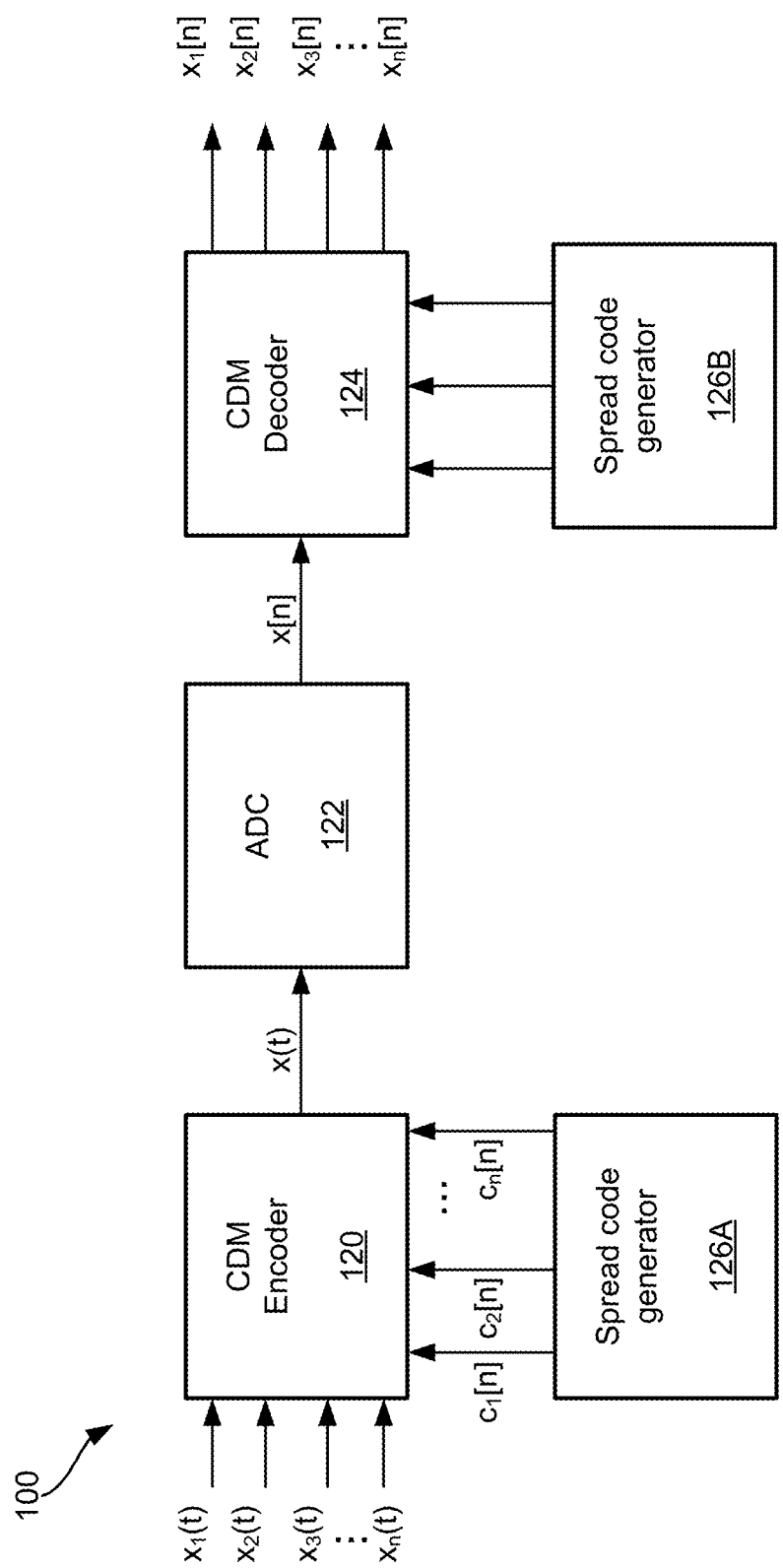
FIG. 1 depicts a high-level functional block diagram of a wireless communication receiver architecture.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments appertain.

FIG. 1 (Prior Art) illustrates a functional block diagram of the architecture of a wireless receiver 100 for processing received analog signals. The wireless receiver 100 includes a code division multiplexing (CDM) encoder module 120, an analog-to-digital converter (ADC) 122, a CDM decoder module 124, and a spread code generator 126A, 126B. Other elements may be present but not illustrated.

As illustrated by FIG. 1, wireless receiver 100 receives analog input signals $x_1(t)$, $x_2(t)$ ... $x_n(t)$, which may be received by one or more antenna structures (not shown), such as, for example, MIMO/M-MIMO antennas. Moreover, each of the received signals may possess different modulation/encoding characteristics.

As shown, the analog input signals $x_1(t)$, $x_2(t)$ ... $x_n(t)$ are forwarded to CDM encoder 120. The CDM encoder 120 is configured to encode and convert the n analog input signals $x_1(t)$, $x_2(t)$ ... $x_n(t)$ into a single, composite, encoded analog signal x(t), in accordance with a supplied coding scheme. That is, spread code generator 126A supplies CDM encoder module 120 with a spread code scheme $c_i[n]$: $c_1[n]$, $c_2[n]$ ... $c_n[n]$.

In particular, the encoding operation of CDM encoder module 120 is accomplished by mixing the analog input signals $x_1(t)$, $x_2(t)$ ... $x_n(t)$ with the spread code scheme $c_1[n]$, $c_2[n]$ ... $c_n[n]$. The outputs of the mixing operation may be subsequently filtered and combined to yield a single analog composite signal x(t).

It will be appreciated that the supplied code scheme $c_1[n]$, $c_2[n]$ ... $c_n[n]$ may be based on any orthogonal codes or PN sequences such as, for example, Walsh, Hadamard, Gold, Barker codes, etc. These codes exhibit desirable coding characteristics and may be implemented at a substantially higher frequency rate than the analog input signals $x_1(t)$, $x_2(t)$ ... $x_n(t)$. In so doing, CDM encoder module 120 outputs a single, composite, high-rate analog signal x(t) that is effectively spread across a wide frequency bandwidth.

The encoded analog composite signal x(t) may be provided to a ADC module 122 having high bandwidth, and operates to convert analog composite signal x(t) into a digital composite signal x[n].

The digital composite signal x[n] is subsequently transmitted for further processing, such as, for example, decoding operations performed by CDM decoder module 124. CDM decoder module 124 processes digital composite signal x[n] to decode and segregate the digital composite signal x[n] to obtain digital input signals $x_1[n]$, $x_2[n]$ ... $x_n[n]$.

That is, CDM decoder module 124 receives and processes digital composite signal x[n] by mixing the digital composite signal $x_i[n]$ with the spread code scheme $c_i[n]$ provided by spread code generator 126B. The resulting mixed samples may be then integrated to generate digital input signals $x_1[n]$, $x_2[n]$ ... $x_n[n]$.

As noted above, wireless receiver 100 requires hardware and software processes, such as, for example, ADC 122, to operate at high processing speeds to accommodate the processing of the encoded, high-rate, wideband signals.

Figure 2:
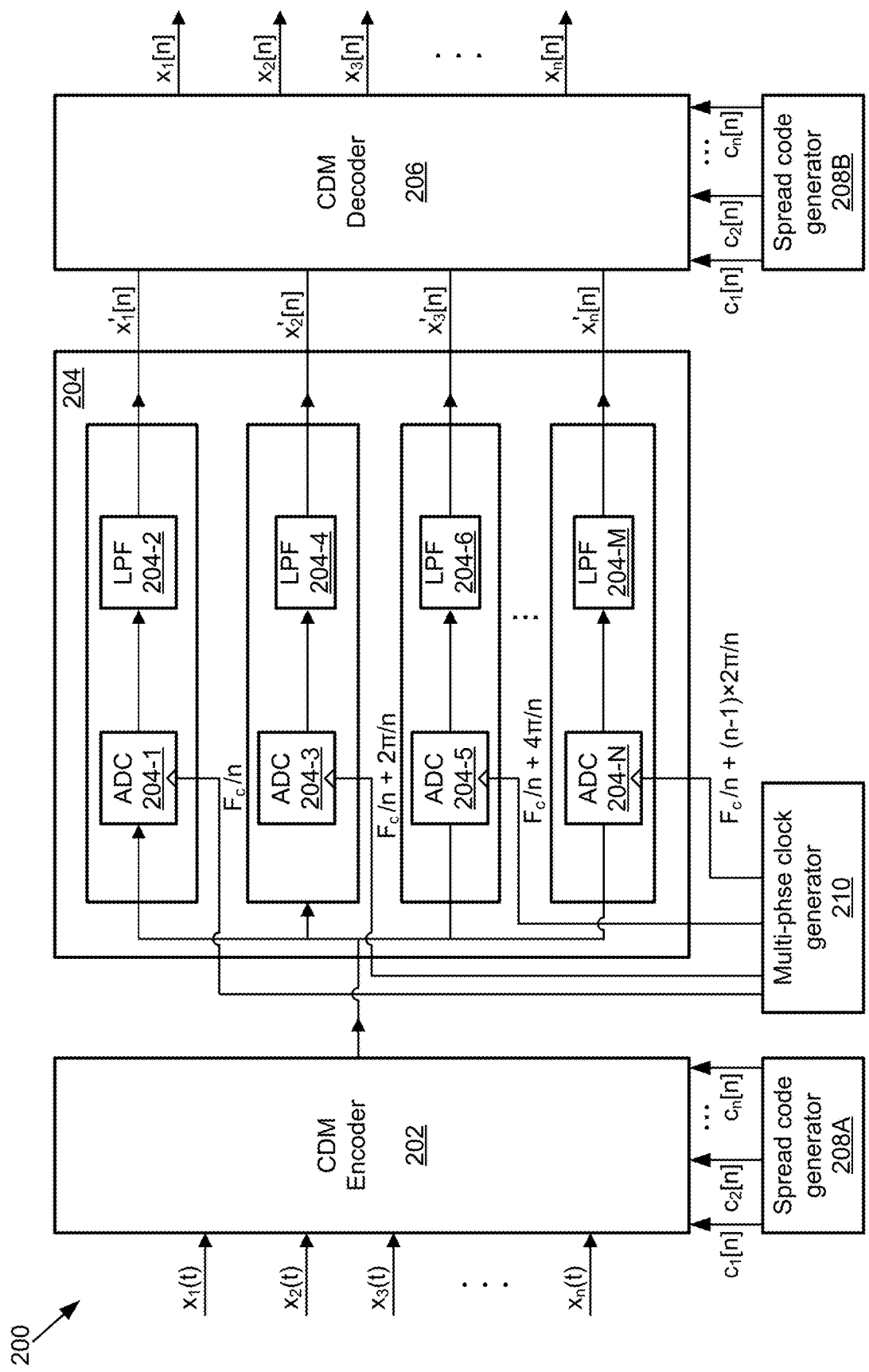
FIG. 2 depicts a high-level functional block diagram of under-sampling receiver architecture, in accordance with various embodiments of the present disclosure.

FIG. 2 depicts a functional block diagram of an architecture of an under-sampling receiver 200, in accordance with various embodiments of the present disclosure. As shown, under-sampling receiver 200 employs a CDM encoder module 202, an under-sampling ADC module 204, a CDM decoder module 206, a spread code generator module 208A, 208B, and a multi-phase clock generator module 210. Other elements may be present but not illustrated for purposes of simplicity.

As will be understood in view of the ensuing descriptions and, in accordance with various embodiments of the present disclosure, the implementation of under-sampling ADC module 204 operates to effectively reduce high sampling rate requirements while maintaining data recovery integrity. In so doing, under-sampling receiver 200 substantially relaxes the hardware/software processing speeds and power consumption required to otherwise accommodate the processing of the encoded, high-rate, wide-band signals.

Moreover, consistent with various embodiments of the present disclosure, it will be appreciated that some or all of the noted elements of under-sampling receiver 200, such as, for example, CDM encoder module 202, under-sampling ADC module 204, CDM decoder module 206, spread code generator module 208A, 208B and/or multi-phase clock generator module 210, may be implemented by software constructs to facilitate integration with existing receiver architectures.

As depicted in FIG. 2, CDM encoder module 202 receives the analog input signals $x_1(t), x_2(t) \ldots x_n(t)$ and is configured to encode and convert the n analog input signals $x_1(t), x_2(t) \ldots x_n(t)$ into a single, composite, encoded analog signal $x(t)$, in accordance with a coding scheme $c_i[n]$: $c_1[n]$, $c_2[n] \ldots c_n[n]$, supplied by spread code generator 208A. Spread code generator 208A generates the codes with a code rate of $F_c$.

Figure 3:
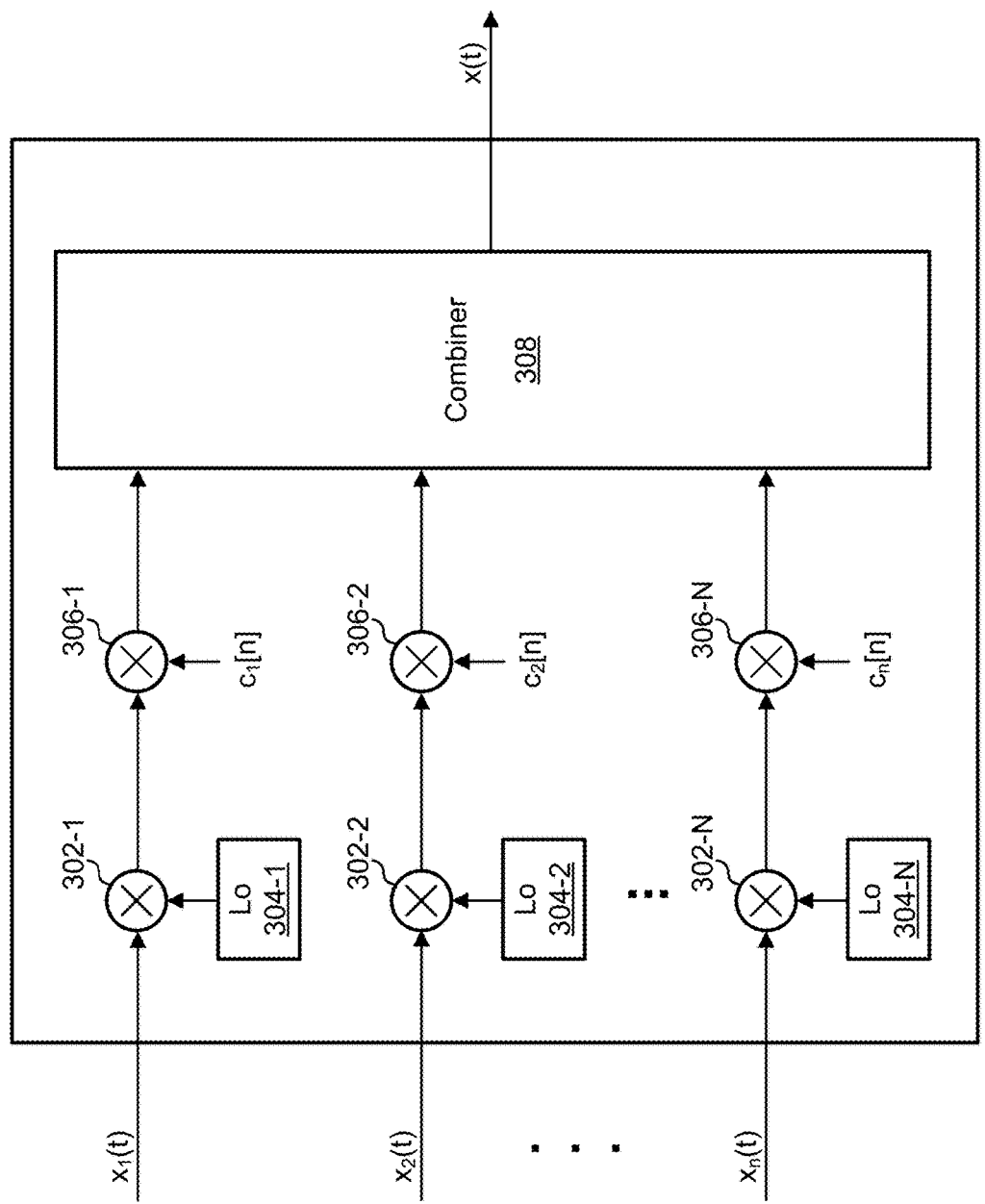
FIG. 3 depicts a high-level functional block diagram of a representative CDM encoder module, in accordance with various embodiments of the present disclosure.

FIG. 3 provides a more detailed functional diagram of CDM encoder module 202, in accordance with various embodiments of present disclosure. As shown, CDM encoder module 202 receives analog input signals $x_1(t)$, $x_2(t) \ldots x_n(t)$. These input signals are forwarded to mixers 302-1, 302-2 . . . 302-N that operate to shift each of the input signals to an intermediate frequency (IF) by mixing the input signals with signals generated by local oscillators 304-1, 304-2 . . . 304-N. In turn, mixers 306-1, 306-2 . . . 306-N operate to mix the IF shifted input signals with a coding scheme $c_i[n]$: $c_1[n]$, $c_2[n] \ldots c_n[n]$ to spread the shifted input signals. The spreading of each of the input signal expands its bandwidth. The shifted and spread input signals are then forwarded to combiner 308. Combiner 308 combines the shifted and spread input signals $x_1(t), x_2(t) \ldots x_n(t)$ to yield a single wideband analog composite signal $x(t)$.

It will be appreciated that the single wideband analog composite signal $x(t)$ strains the receiver hardware and software processing resources of the receiver. This is due to the limited bandwidth processing capabilities of ADC module 122. In a conventional receiver, the ADC should be operated at a sampling rate or clock rate that is at least twice the bandwidth of the input signal for satisfactory analog to digital without any loss of information.

As discussed above regarding wireless receiver 100, ADC module 122 employs a single ADC, having high bandwidth, to convert single wideband analog composite signal $x(t)$ into a digital composite signal $x[n]$. However, as illustrated in FIG. 2, under-sampling receiver 200 includes an under-sampling ADC module 204 that employs a bank of under-sampling ADCs 204-1, 204-3, 204-5 . . . 204-N. Each of the undersampling ADCs operates with a lower bandwidth and quantization resolution. The bank of under-sampling ADCs 204-1, 204-3, 204-5 . . . 204-N are followed in the signal chain by a bank of low pass filters 204-2, 204-4, 204-6 . . . 204-M, respectively, wherein the number of under-sampling ADCs and the number of low pass filters can be equal to, or greater than, the number of input signals. The ADCs employed in the under-sampling ADC module 204 can be any suitable analog-to-digital converter, such as, for example based on delta-sigma modulation etc. It will be understood, in view of the following discussion, that the use of a plurality of ADCs operating in an undersampling manner, allow for suitably reliable and accurate operation without incurring the problems associated with the use of a single high speed ADC as discussed above with respect to FIG. 1.

As shown in FIG. 2, the analog composite signal $x(t)$ is forwarded to under-sampling ADC module 204 where it is fed to the bank of under-sampling ADCs 204-1, 204-3, 204-5 . . . 204-N in parallel fashion. The sampling rate of each under-sampling ADCs is $$\frac{F_c}{n},$$

where $F_c$ is the code rate and n is number of codes in coding scheme $c_i[n]$: $c_1[n], c_2[n] \ldots c_n[n]$. Each under-sampling ADC samples the analog composite signal $x(t)$ with the sampling frequency of $$\frac{F_c}{n}.$$

In so doing, each under-sampling ADC causes the symmetrical folding of the spectrum which leads to images of sampled analog composite signal $x(t)$ to alias and fall on top of each other, thereby reducing the overall bandwidth requirement.

The information from the under-sampled analog composite signal $x(t)$ is subsequently recovered in an interleaved fashion. In other words, each of under-sampling ADCs 204-1, 204-3, 204-5 . . . 204-N is provided with a phase-shifted clock generated by multi-phase clock generator module 210. Each clock is phase-shifted by $$k\frac{2\pi}{n}$$

where k ranges from 0 to n−1 in which n is total number of codes. For instance, under-sampling ADC 204-1 is operated at clock frequency $$\frac{F_c}{n},$$

while under-sampling ADC 204-2 is operated at clock frequency $$\frac{F_c}{n} + \frac{2\pi}{n},$$

and so on. Further, the output of each under-sampling ADC 204-1, 204-3, 204-5 . . . 204-N is forwarded to low pass filters 204-2, 204-4, 204-6 . . . 204-M. The low pass filters 204-2, 204-4, 204-6 . . . 204-M operate to assist under-sampling ADC module 204 to improve the quality of under-sampled analog composite signal x(t) by shaping the noise profile introduced by quantization errors. The output of low pass filters 204-2, 204-4, 204-6 . . . 204-M yield under-sampled digital composite signals $x_1'[n]$, $x_2'[n]$ . . . $x_n'[n]$, wherein each signal contains samples in accordance with phase-shifted clock.

Figure 4:
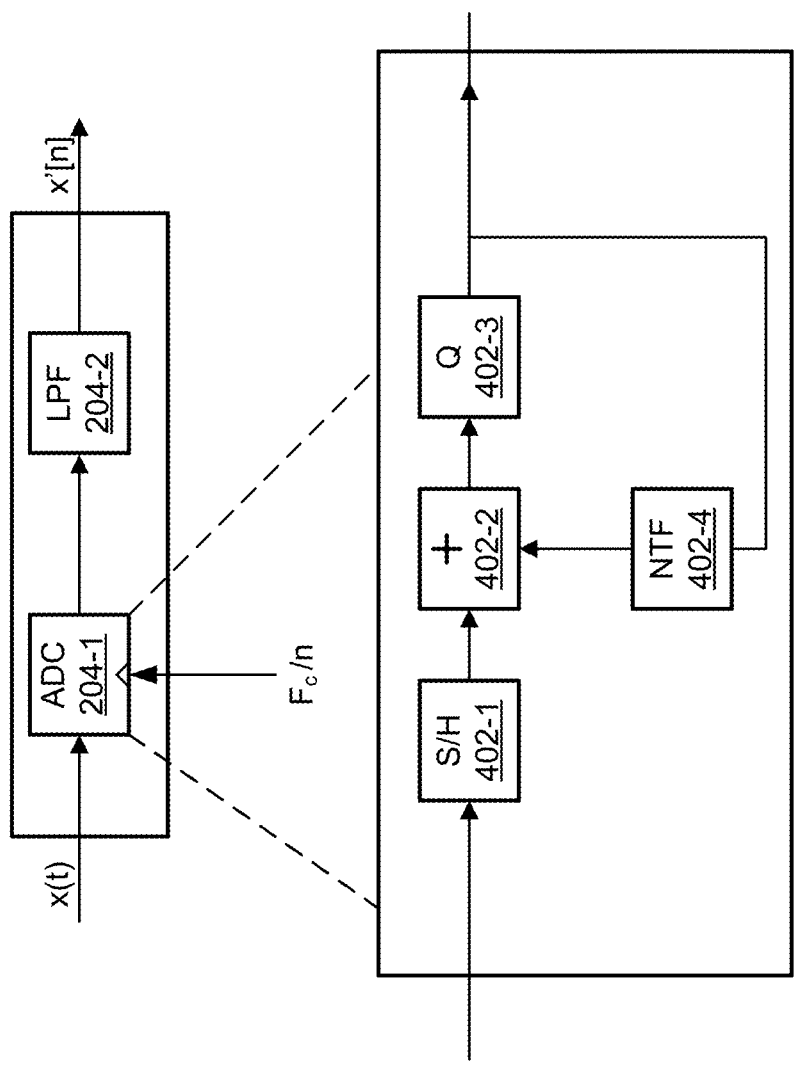
FIG. 4 depicts a high-level functional block diagram of a representative ADC module, in accordance with various embodiments of the present disclosure.

FIG. 4 illustrates a high level functional block diagram of under-sampling ADC 204-1, in accordance with various embodiments of present disclosure. As shown, under-sampling ADC 204-1 employs a sample and hold circuit 402-1, a subtractor 402-2, a quantizer 402-3, and a noise transfer function (NTF) generator 402-4.

The analog composite signal x(t) is supplied to sample and hold circuit 402-1, where sample and hold circuit 402-1 samples continuously-varying analog composite signal x(t) and holds its value at a constant level for a specified minimum time interval. The sampled and held value is then quantized by quantizer 402-3. The quantized sample is fed-back to NTF generator 402-4, which continuously generates a signal, based on the output of quantizer 402-3, to cancel the quantization noise generated by quantizer 402-3. That is, the signal generated by NTF generator 402-4 is subtracted from the sampled value of analog composite signal x(t) to compensate for the noise introduced by quantizer 402-3. As such, NTF generator 402-4 enables ADC 402 to effectively operate at low quantization levels.

The output of quantizer 402-3 is then fed to low pass filter 204-2. The low pass filter 204-2 operates to filter quantization noise in the signal provided by quantizer 402-3. Thus, NTF generator 402-4, low pass filter 204-2 assists the under-sampling ADC 204-1 to be operated on a low quantization level. It is to be understood that a similar architecture as that of under-sampling ADC 204-1 is being used by other under-sampling ADC 204-3, 204-5 . . . 204-N as well.

Returning to FIG. 2, the digital composite signals $x_1'[n]$, $x_2'[n]$ . . . $x_n'[n]$ are subsequently transmitted to CDM decoder module 206 for further processing. CDM decoder module 206 processes digital composite signals $x_1'[n]$, $x_2'[n]$ . . . $x_n'[n]$ in an interleaved manner to decode and segregate digital composite signals $x_1'[n]$, $x_2'[n]$ . . . $x_n'[n]$ to obtain digital input signals $x_1[n]$, $x_2[n]$ . . . $x_n[n]$, in accordance with coding scheme $c_i[n]$: $c_1[n]$, $c_2[n]$ . . . $c_n[n]$, supplied by spread code generator 208B. Spread code generator 208B generates the codes with a code rate of $F_c$.

Figure 5:
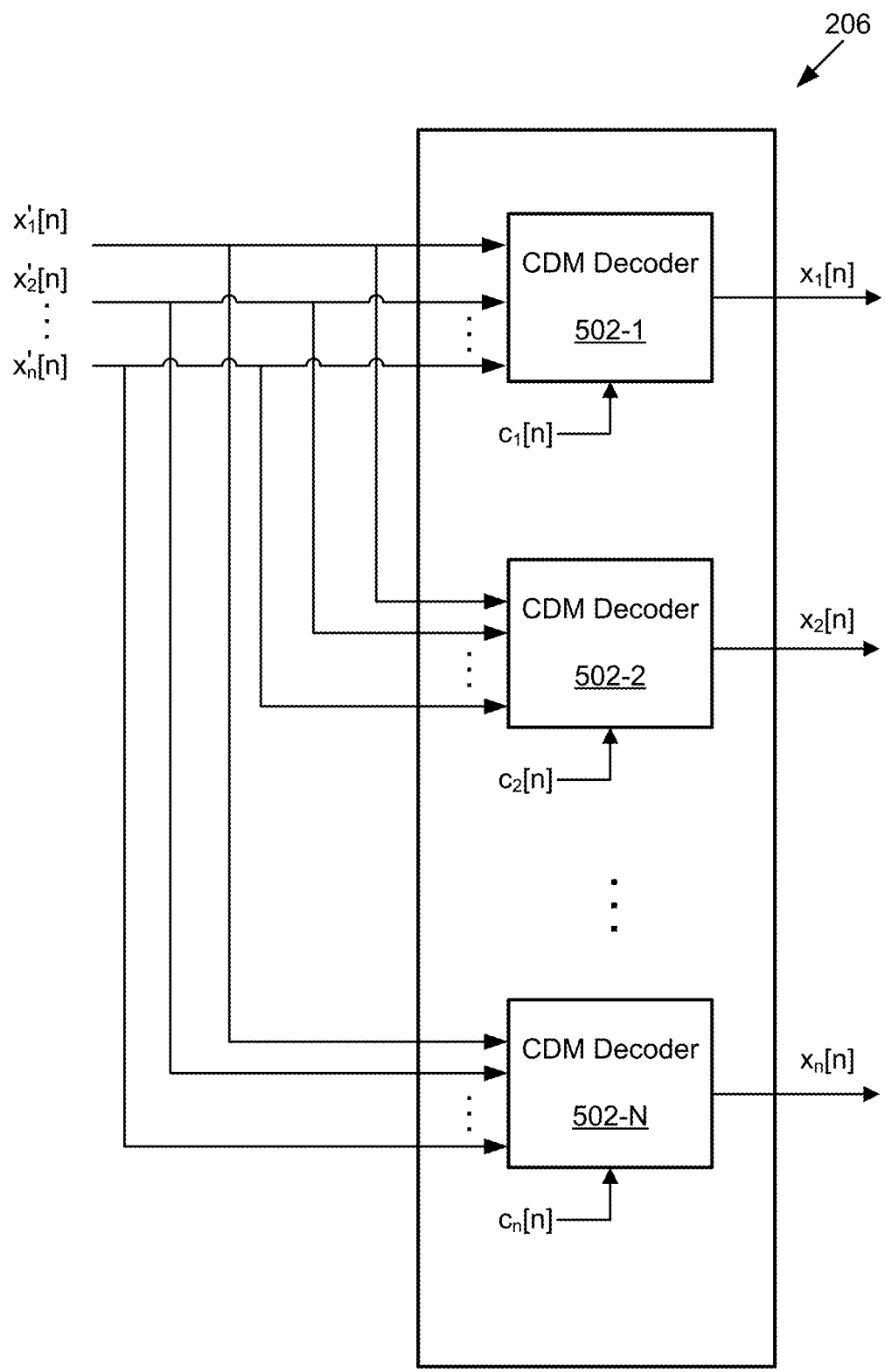
FIG. 5 depicts a high-level functional block diagram of a representative CDM decoder module, in accordance with various embodiments of the present disclosure.

Further, FIG. 5 depicts, CDM decoder module 206 in accordance with various embodiments of present disclosure. CDM decoder module 206 employs a group of CDM decoders 502-1, 502-2 . . . 502-N, wherein the number of CDM decoders is equal to number of codes in coding scheme $c_i[n]$: $c_1[n]$, $c_2[n]$ . . . $c_n[n]$ which is further equal to number of analog input signals.

As illustrated in FIG. 5, CDM decoder module 206 receives digital composite signals $x_1'[n]$, $x_2'[n]$ . . . $x_n'[n]$. Each of the received digital composite signals is forwarded to each of the CDM decoders 502-1, 502-2 . . . 502-N. In the illustrated embodiment this is done in a parallel fashion. Each CDM decoder 502-1, 502-2 . . . 502-N further receives a suitable spread code from coding scheme $c_i[n]$: $c_1[n]$, $c_2[n]$ . . . $c_n[n]$ to decode and segregate digital composite signals $x_1'[n]$, $x_2'[n]$ . . . $x_n'[n]$ in order to obtain digital input signals $x_1[n]$, $x_2[n]$ . . . $x_n[n]$ in an interleaved manner. The output of each CDM decoder 502-1, 502-2 . . . 502-N will be digital version of analog input signals $x_1(t)$, $x_2(t)$ . . . $x_n(t)$. For instance, the output of CDM decoder 502-1 will be digital input signals $x_1[n]$ corresponding to analog input signal $x_1(t)$, while the output of CDM decoder 502-2 will be digital input signals $x_2[n]$ corresponding to analog input signal $x_2(t)$ and so on.

Figure 6:
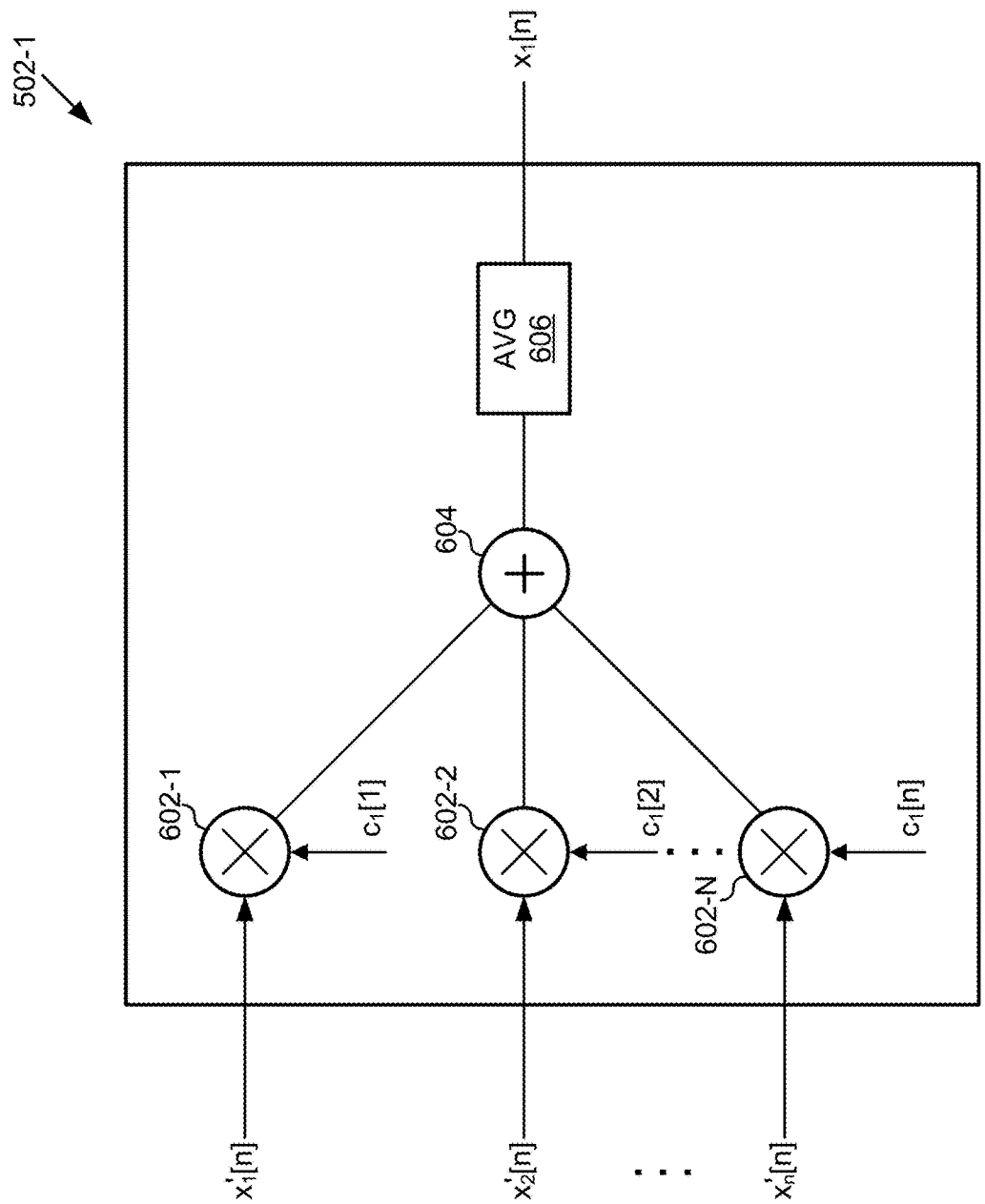
FIG. 6 depicts an exemplary high-level functional block diagram of a representative CDM decoder, in accordance with various embodiments of the present disclosure.

FIG. 6 illustrates a high level functional block diagram of CDM decoder 502-1 in accordance with various embodiments of present disclosure. As shown, CDM decoder 502-1 employs a group of mixers 602-1, 602-2 . . . 602-N wherein the number of mixers is equal to number of digital input. CDM decoder 502-1 further employs an adder 604 and an averaging module 606.

As shown, each mixer 602-1, 602-2 . . . 602-N receives a corresponding digital composite signal $x_1'[n]$, $x_2'[n]$ . . . $x_n'[n]$ respectively. In turn mixers 602-1, 602-2 . . . 602-N then mix the digital composite signal $x_1'[n]$, $x_2'[n]$ . . . $x_1'[n]$ with suitable spread code bit. For instance, mixer 602-1 mixes digital composite signal $x_1'[n]$ with first bit of code $c_1[n]$ i.e. $c_1[1]$, while mixer 602-2 mixes digital composite signal $x_2'[n]$ with second bit of code $c_1[n]$ i.e. $c_1[2]$ and so on. The output of mixers 602-1, 602-2 . . . 602-N are added in an interleaving manner by adder 604 and averaging module 606 then averages the output of adder 604 to give digital input signal $x_1[n]$. It is to be understood that a similar architecture as that of CDM decoder 502-1 is being used by other CDM decoder 502-2 . . . 502-N as well.

Figure 7A:
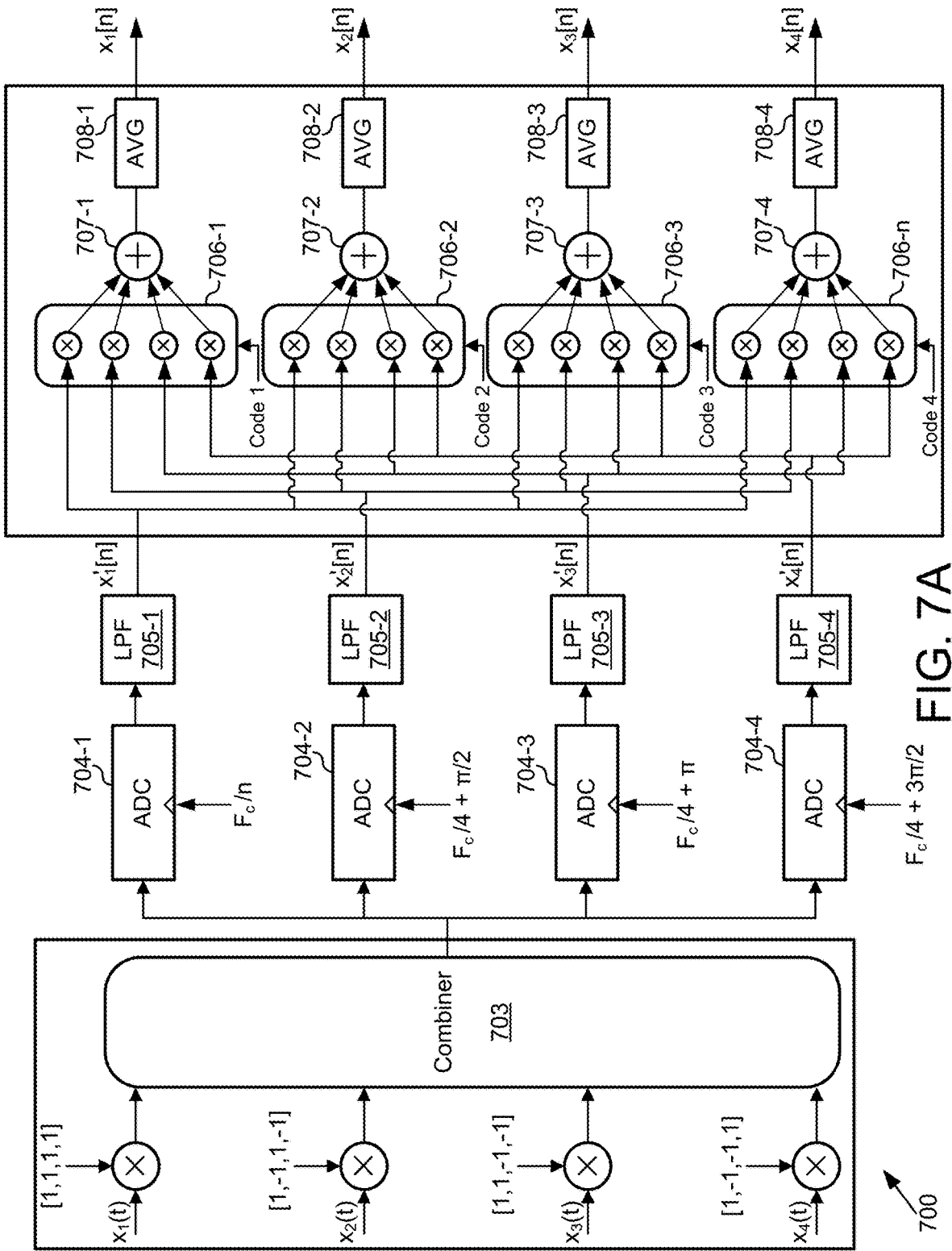
FIG. 7A depicts an exemplary high-level functional block diagram of under-sampling receiver architecture, in accordance with various embodiments of the present disclosure.

FIG. 7A depicts an exemplary functional block diagram of under-sampling receiver architecture 700, in accordance with various embodiments of the present disclosure. Under-sampling receiver architecture 700 receives four analog input signals $x_1(t)$, $x_2(t)$, $x_3(t)$ and $x_4(t)$ and process them in a similar manner as explained above. Further, under-sampling receiver architecture 700 employs a bank of mixers 702-1, 702-2, 702-3 and 702-4 to mix the analog input signals $x_1(t)$, $x_2(t)$, $x_3(t)$ and $x_4(t)$ with suitable spread codes, a combiner 703, a bank of under-sampling ADC 704-1, 704-2, 704-3 and 704-4, a bank of low pass filters 705-1, 705-2, 705-3 and 705-4, a bank of mixers 706-1, 706-2, 706-3 and 706-4 to mix digital composite signal $x_1'[n]$, $x_2'[n]$, $x_3'[n]$ and $x_4'[n]$ with suitable spread codes, a bank of adders 707-1, 707-2, 707-3 and 707-4 and a bank of averaging module 708-1, 708-2, 708-3 and 708-4.

As illustrated by FIG. 7A, under-sampling receiver 700 receives analog input signals $x_1(t)$, $x_2(t)$, $x_3(t)$ and $x_4(t)$, which may be received by one or more antenna structures (not shown), such as, for example, MIMO/M-MIMO antennas. Moreover, each of the received signals may possess different modulation/encoding characteristics.

As shown, the analog input signals $x_1(t)$, $x_2(t)$, $x_3(t)$ and $x_4(t)$ are then forwarded to the bank of mixers 702-1, 702-2, 702-3 and 702-4. In turn, mixers 702-1, 702-2, 702-3 and 702-4 are configured to encode the analog input signals $x_1(t)$, $x_2(t)$, $x_3(t)$ and $x_4(t)$ by mixing analog input signals $x_1(t)$, $x_2(t)$, $x_3(t)$ and $x_4(t)$ with suitable spread codes $c_1[n]$, $c_2[n]$, $c_3[n]$, $c_4[n]$ respectively. The outputs of the mixing operation may be subsequently filtered and combined by combiner 703 to convert analog input signals $x_1(t)$, $x_2(t)$, $x_3(t)$ and $x_4(t)$ into a single, composite, encoded analog signal x(t).

It will be appreciated that the supplied code scheme $c_1[n]$, $c_2[n]$, $c_3[n]$, $c_4[n]$ may be based on any of a number of different codes including orthogonal codes or PN sequences such as Walsh, Hadamard, Gold and Barker codes. These codes exhibit desirable coding characteristics and may be implemented at a substantially higher frequency rate than the analog input signals $x_1(t)$, $x_2(t)$, $x_3(t)$ and $x_4(t)$. In so doing, combiner 703 outputs a single, composite, high-rate analog signal x(t) that is effectively spread across a wide frequency bandwidth.

In particular, for example, the spread codes used by the under-sampling receiver 700 are Hadamard orthogonal codes with a length of each code is equal to four and Hadamard Codes are as shown below:

$$\begin{bmatrix} c_1[n] \\ c_2[n] \\ c_3[n] \\ c_4[n] \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

As illustrated in FIG. 7A: mixer 702-1 mixes the analog input signal $x_1(t)$ with $c_1[n]$ i.e. [+1 +1 +1 +1]; mixer 702-2 mixes the analog input signal $x_2(t)$ with $c_2[n]$ i.e. [+1 −1 +1 −1]; mixer 702-3 mixes the analog input signal $x_3(t)$ with $c_3[n]$ i.e. [+1 +1 −1 −1]; and mixer 702-4 mixes the analog input signal $x_4(t)$ with $c_4[n]$ i.e. [+1 −1 −1 +1]. In so doing, combiner 703 then convert the analog input signals $x_1(t)$, $x_2(t)$, $x_3(t)$ and $x_4(t)$ into a single, composite, encoded analog signal x(t).

The composite analog signal x(t) is then forwarded to under-sampling ADCs 704-1, 704-2, 704-3 and 704-4 in parallel fashion. Each under-sampling ADC 704-1, 704-2, 704-3 and 704-4 then samples the analog composite signal x(t) with the sampling frequency of $F_c/4$. In so doing, each under-sampling ADC 704-1, 704-2, 704-3 and 704-4 causes the symmetrical folding of the spectrum which leads to images of sampled analog composite signal x(t) to alias and fall on top of each other thereby reducing the overall bandwidth requirement.

The information from the under-sampled analog composite signal x(t) can then be recovered in an interleaved fashion. In other words, each of under-sampling ADCs 704-1, 704-2, 704-3 and 704-4 is provided with a phase-shifted clock. Each clock is phase-shifted by $$k\frac{2\pi}{4}$$

where k ranges from 0 to 3. For instance, under-sampling ADC 704-1 is operated at clock frequency $$\frac{F_c}{4},$$

under-sampling ADC 704-2 is operated at clock frequency $$\frac{F_c}{4} + \frac{\pi}{2},$$

under-sampling ADC 704-3 is operated at clock frequency $$\frac{F_c}{4} + \pi,$$

and under-sampling ADC 704-4 is operated at clock frequency $$\frac{F_c}{4} + \frac{3\pi}{4}.$$

Further, the output of each under-sampling ADC 704-1, 704-2, 704-3 and 704-4 is forwarded to low pass filters 705-1, 705-2, 705-3 and 705-4 respectively. The low pass filters 705-1, 705-2, 705-3 and 705-4 operates to assist under-sampling ADC 704-1, 704-2, 704-3 and 704-4 to improve the quality of under-sampled analog composite signal x(t) by shaping the noise profile introduced by quantization errors. The output of low pass filters 705-1, 705-2, 705-3 and 705-4 yields under-sampled digital composite signals $x_1'[n]$, $x_2'[n]$, $x_3'[n]$ and $x_4'[n]$ wherein each signal contains samples in accordance with phase shifted clock.

As shown, digital composite signals $x_1'[n]$, $x_2'[n]$, $x_3'[n]$ and $x_4'[n]$ are forwarded to mixer 706-1, 706-2, 706-3 and 706-4. For instance, mixer 706-1 receives digital composite signal $x_1'[n]$, mixer 706-2 receives digital composite signal $x_2'[n]$, mixer 706-3 receives digital composite signal $x_3'[n]$ and mixer 706-4 receives digital composite signal $x_4'[n]$. In turn mixers 706-1, 706-2, 706-3 and 706-4 then mix the digital composite signal $x_1'[n]$, $x_2'[n]$, $x_3'[n]$ and $x_4'[n]$ with suitable spread codes. Output of mixer 706-1, 706-2, 706-3 and 706-4 are interleaved with the help of adders 707-1, 707-2, 707-3 and 707-4, average of each interleaved signal is taken with the help of averaging module 708-1, 708-2, 708-3 and 708-4 to get the final digital input signals $x_1[n]$, $x_2[n]$, $x_3[n]$ and $x_4[n]$.

Figure 7B:
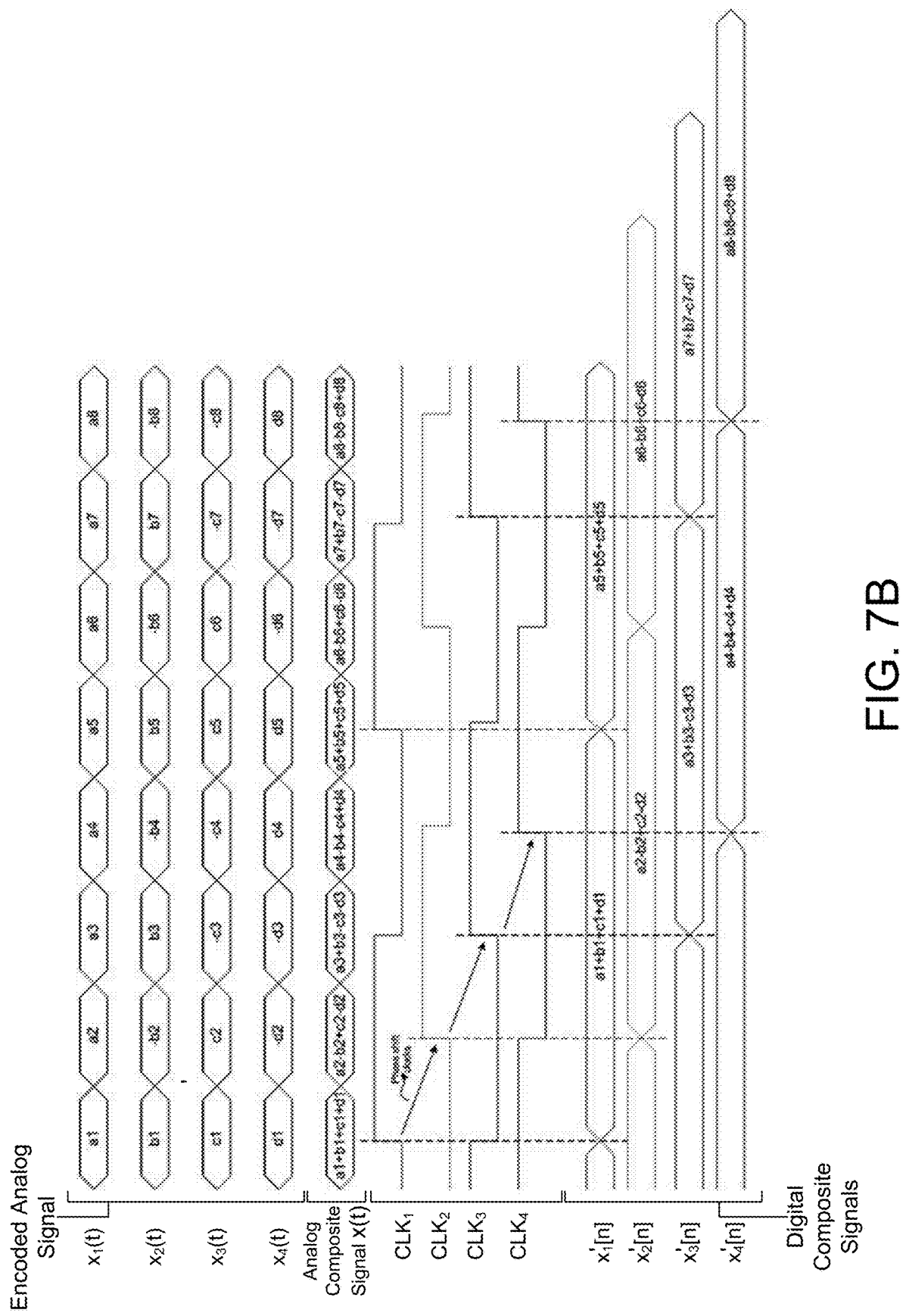
FIG. 7B illustrates an exemplary timing diagram for under-sampling receiver architecture, in accordance with various embodiments of the present disclosure.

FIG. 7B illustrates an exemplary timing diagram for under-sampling receiver architecture 700. As shown, each of the clock pulse $CLK_1$, $CLK_2$, $CLK_3$, and $CLK_4$ has a phase-shift of $\pi/2$. For instance, $CLK_2$ has phase-shift of $\pi/2$ with respect to $CLK_1$, while $CLK_3$ has phase-shift of $\pi/2$ with respect to $CLK_2$, and $CLK_4$ has phase shift of $\pi/2$ with respect to $CLK_3$. Frequency of each of the clock pulse $CLK_1$, $CLK_2$, $CLK_3$, and $CLK_4$ is $F_c/4$, wherein $F_c$ is code rate.

Under-sampling ADC 704-1, 704-2, 704-3 and 704-4 operates at the positive edges of $CLK_1$, $CLK_2$, $CLK_3$, and $CLK_4$ respectively and samples analog composite signal x(t) in accordance with the phase-shifted clocks as shown in FIG. 7B to output digital composite signal $x_1'[n]$, $x_2'[n]$, $x_3'[n]$ and $x_4'[n]$ respectively. It is to be understood that Under-sampling ADC 704-1, 704-2, 704-3 and 704-4 may operates at the negative edges of $CLK_1$, $CLK_2$, $CLK_3$, and $CLK_4$ respectively.

Figure 7C:
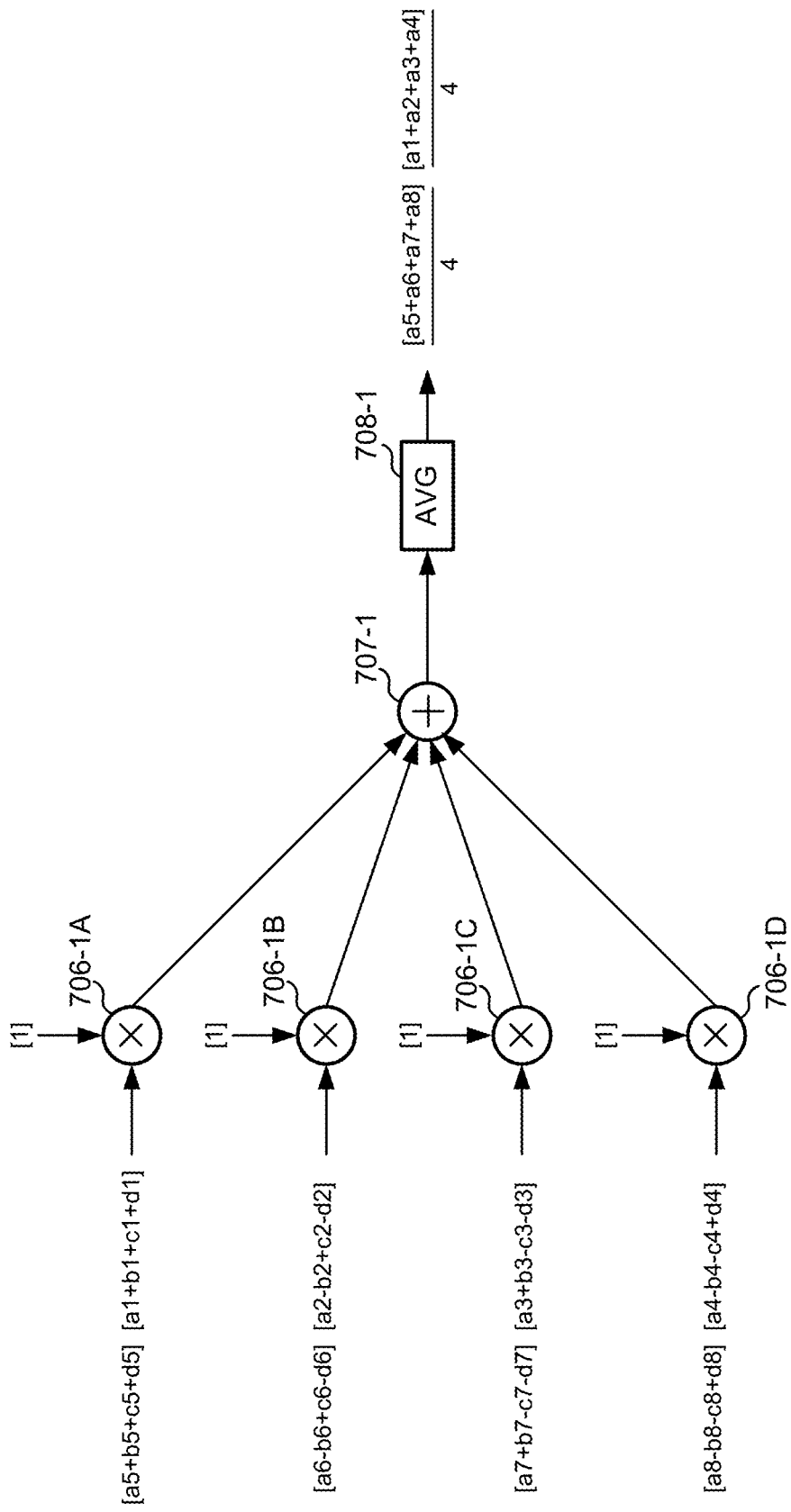
FIGS. 7C-7F illustrates functional block diagrams of decoding operation for under-sampling receiver architecture, in accordance with various embodiments of the present disclosure.

FIGS. 7C-7F illustrates functional block diagrams of decoding operation for under-sampling receiver architecture 700. As shown in FIG. 7C, mixer 706-1 further consist of sub-mixers 706-1A, 706-1B, 706-1C, and 706-1D. Each sub-mixers 706-1A, 706-1B, 706-1C, and 706-1D receives a digital composite signal $x_1'[n]$, $x_2'[n]$, $x_3'[n]$ and $x_4'[n]$ as shown in FIG. 7B, respectively. For instance, mixer 706-1A receives digital composite signal $x_1'[n]$ i.e. [a5+b5+c5+d5][a1+b1+c1+d1], mixer 706-1B receives digital composite signal $x_2'[n]$ i.e. [a6−b6+c6−d6][a2−b2+c2−d2], mixer 706-1C receives digital composite signal $x_3'[n]$ i.e. [a7+b7−c7−d7][a3+b3−c3−d3], and mixer 706-1D receives digital composite signal $x_4'[n]$ i.e. [a8−b8−c8+d8][a4−b4−c4+d4]. In turn, sub-mixers 706-1A, 706-1B, 706-1C, and 706-1D then mix the digital composite signal $x_1'[n]$, $x_2'[n]$, $x_3'[n]$ and $x_4'[n]$ with suitable spread code bit. For instance, mixer 706-1A mixes digital composite signal $x_1'[n]$ with first bit of code $c_1[n]$ i.e. [1], mixer 706-1B mixes digital composite signal $x_2'[n]$ with second bit of code $c_1[n]$ i.e. [1], mixer 706-1C mixes digital composite signal $x_3'[n]$ with third bit of code $c_1[n]$ i.e. [1], mixer 706-1D mixes digital composite signal $x_4'[n]$ with fourth bit of code $c_1[n]$ i.e. [1]. The output of sub-mixers 706-1A, 706-1B, 706-1C, and 706-1D are interleaved by adder 707-1 and averaging module 708-1, averages the output of adder 707-1 to give digital input signal $x_1[n]$.

Figure 7D:
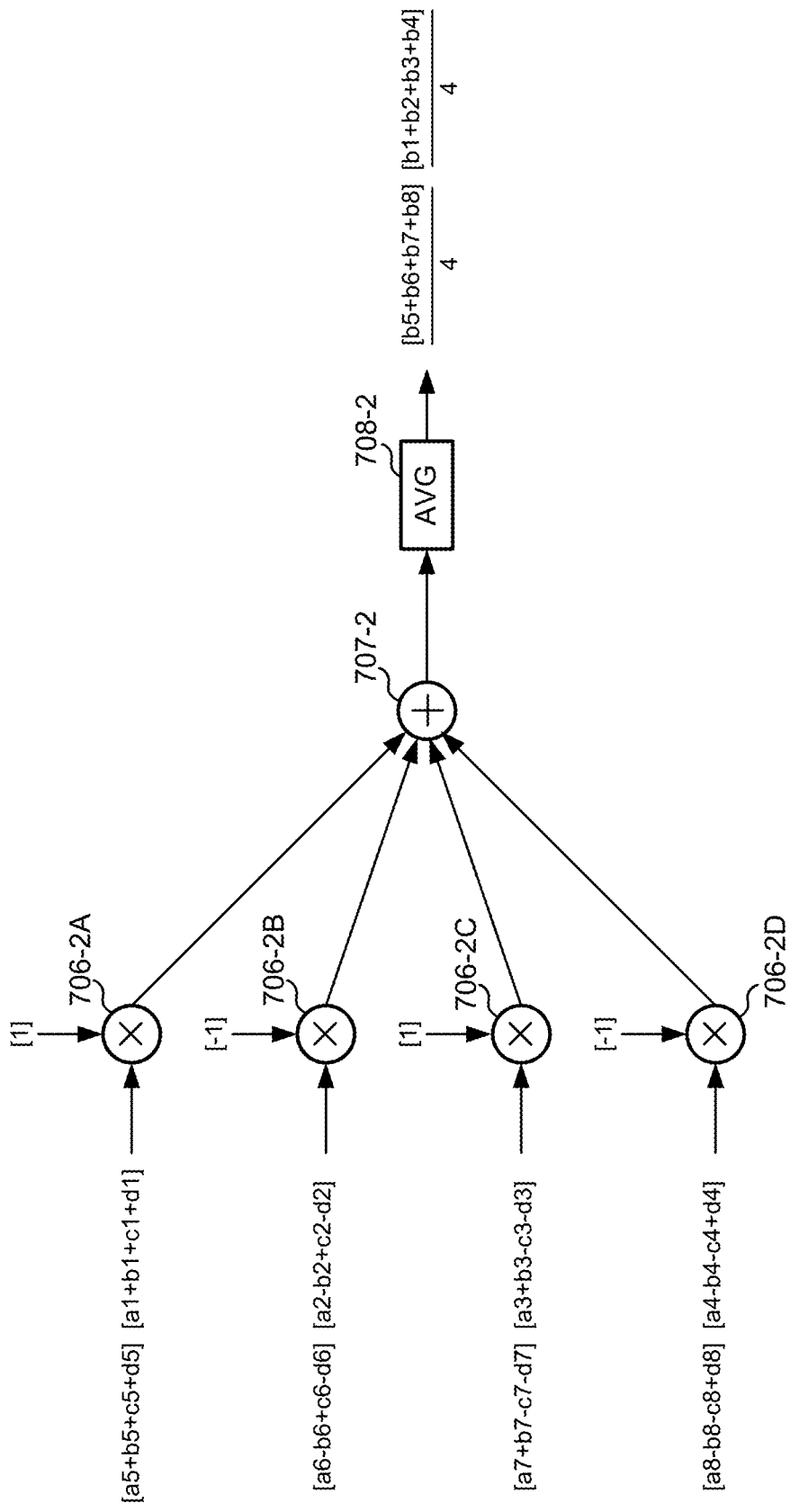
Figure 7E:
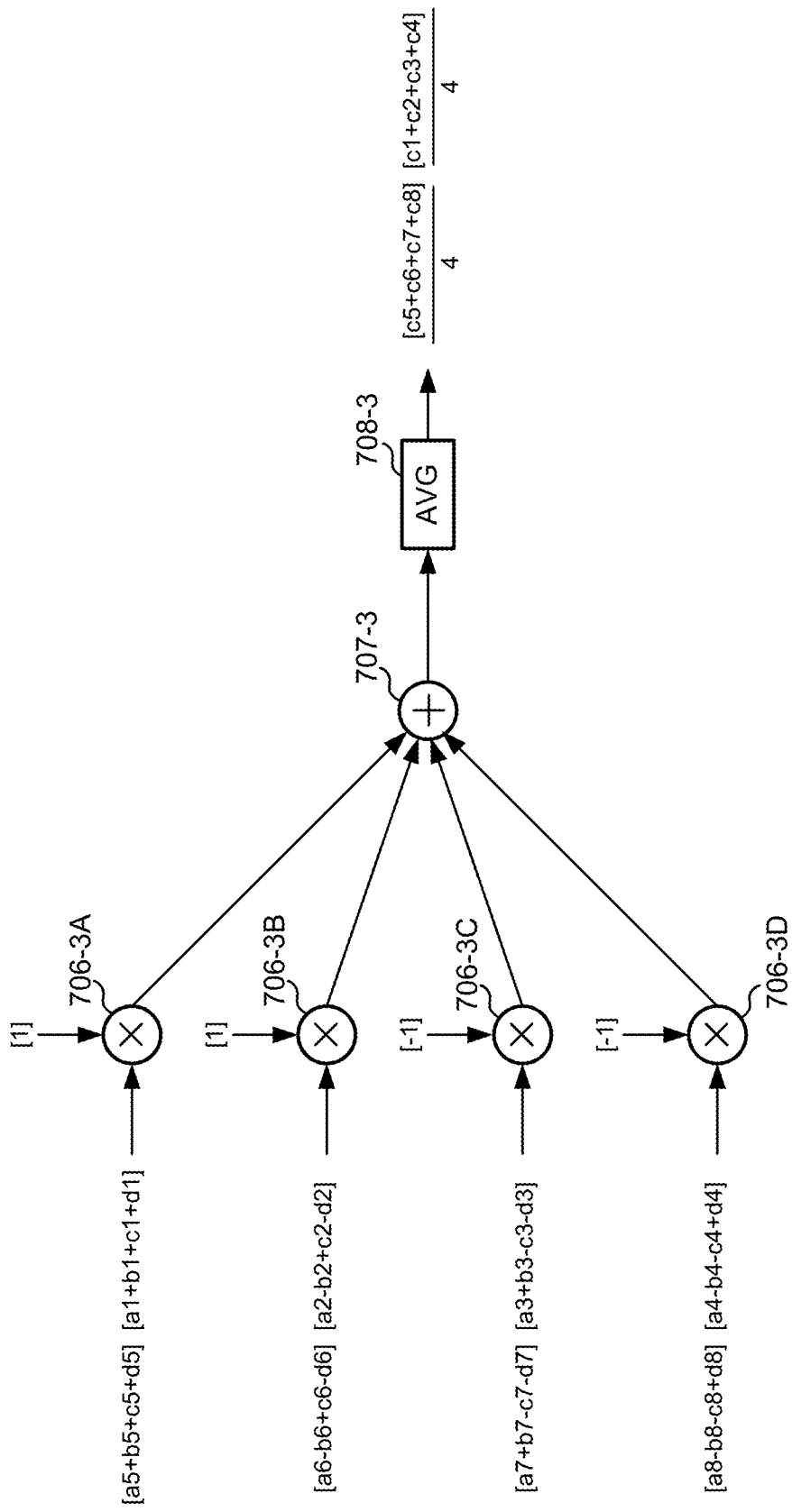
Figure 7F:
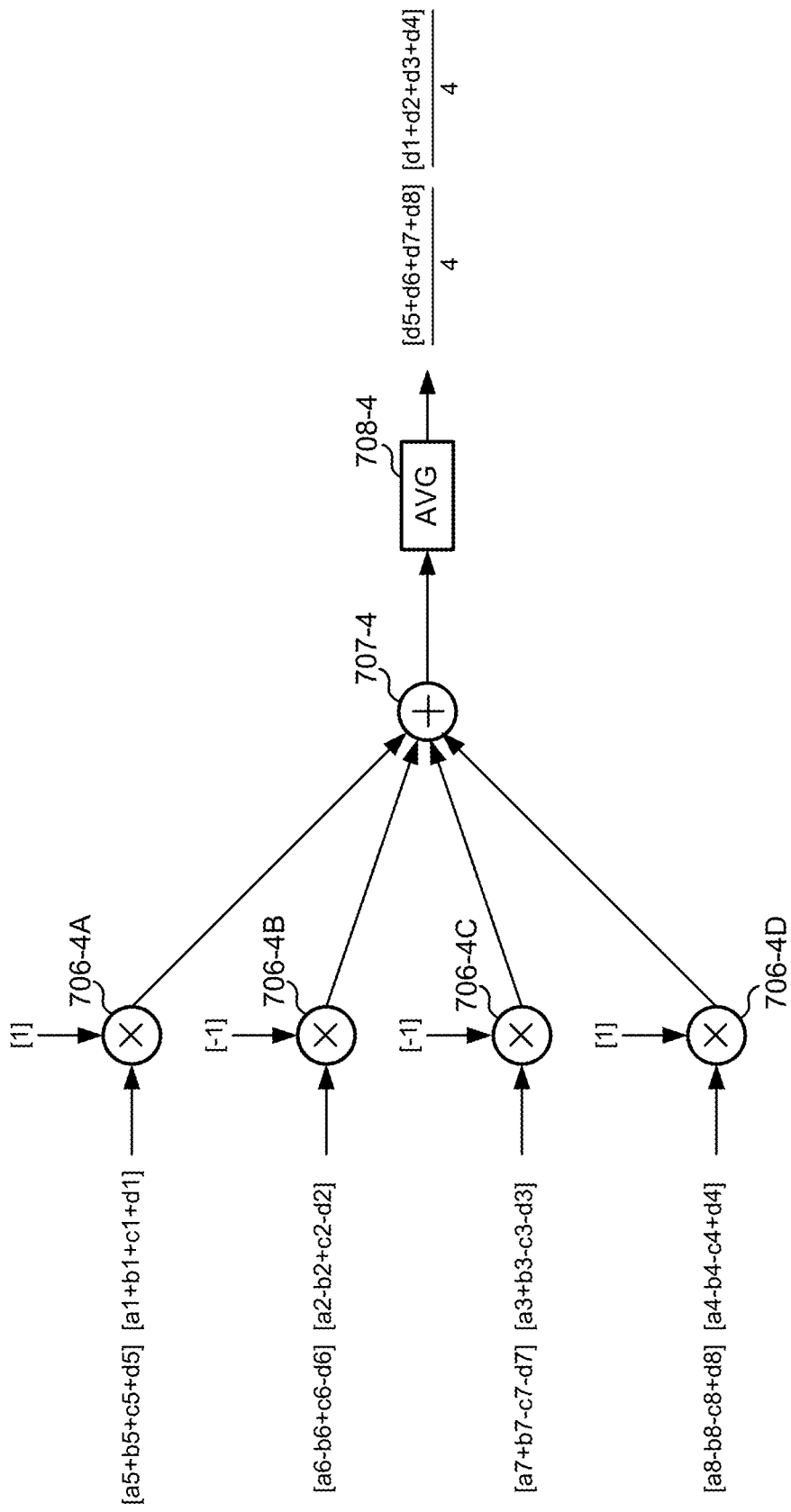

As shown in FIG. 7D, mixer 706-2 further consist of sub-mixers 706-2A, 706-2B, 706-2C, and 706-2D, adder 707-2, averaging module 708-2 operates in a similar manner as explained above to give digital input signal $x_2[n]$ using spread code $c_2[n]$, i.e. [+1−1+1−1]. Further, FIG. 7E illustrates, mixer 706-3 further consist of sub-mixers 706-3A, 706-3B, 706-3C, and 706-3D, adder 707-3, averaging module 708-3 operates in a similar manner as explained above to give digital input signal $x_3[n]$ using spread code $c_3[n]$, i.e. [+1+1−1−1] and FIG. 7E illustrates, mixer 706-4 further consist of sub-mixers 706-4A, 706-4B, 706-4C, and 706-4D, adder 707-4, averaging module 708-4 operates in a similar manner as explained above to give digital input signal $x_4[n]$ using spread code $c_3[n]$, i.e. [+1−1−1+1].

Figure 8:
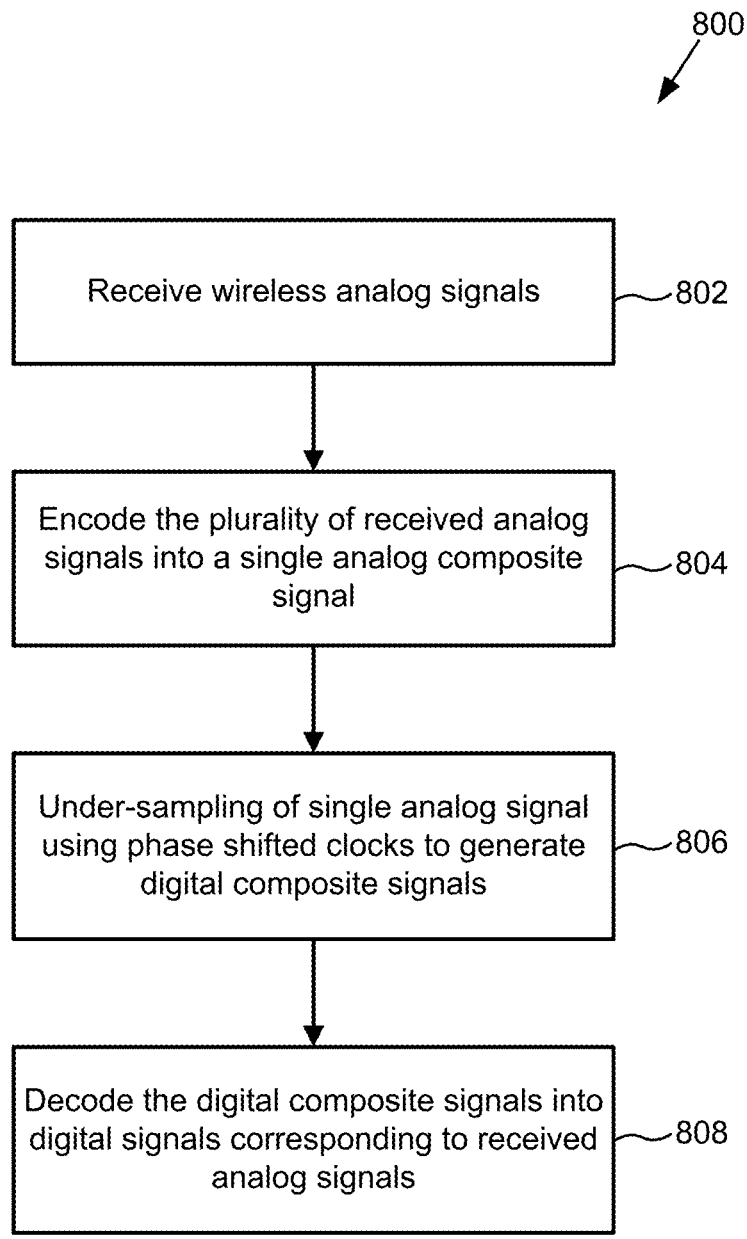
FIG. 8 depicts a functional flow diagram of under-sampling receiver architecture processing, in accordance with various embodiments of the present disclosure.

FIG. 8 depicts a functional flow diagram of process 800 directed to under-sampling receiver processing, in accordance with various embodiments of the present disclosure.

As shown, process 800 begins at task block 802, in which under-sampling receiver architecture 200 receives a plurality of analog signals containing desired information content. As noted above, architecture 200 may include one or more antenna structures operative to receive the analog signals.

Process 800 proceeds to task block 804, where architecture 200 encodes the plurality of received signals into a single analog composite signal, based on a coding scheme. As noted above, spread code generator module 208A operates to generate a coding scheme supplied to CDM encoder module 202. In turn CDM encoder module 202 operates to mix and combine multiple received signals with the coding scheme to output a single, composite analog signal.

At task block 806, architecture 200 operates to sample analog composite signal at rate lower than required, thereby under-sampling the analog composite signal based on phase-shifted clocks to generate digital composite signals. That is, as described above, under-sampling ADC module 204 performs under-sampling operations to generate digital composite signals and then filters the digital composite signals to remove quantization noise.

Finally, at task 808, architecture 200 decodes digital composite signals to output digital signals corresponding to the received analog signals containing the desired content. As previously described, CDM decoder module 206 operates to decode and recover the encoded signal information by mixing digital composite signals with coding scheme, adding the mixed signals in an interleaving manner and then averaging to produce digital signals corresponding to the received analog signals containing the desired content.

Thus, by virtue of the under-sampling techniques employed by under-sampling receiver architecture 200, hardware/software processing speeds are reduced, lower-bandwidth resources may be implemented, and power consumption is decreased.

It is to be understood that the operations and functionality of the described under-sampling receiver architecture, constituent components, and associated processes may be achieved by hardware-based, software-based, firmware-based elements and/or combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A wireless receiver, comprising:
    a plurality of signal encoders configured to encode a plurality of received analog signals into a plurality of encoded analog signals in accordance with a coding scheme having a code rate $F_c$;
    a combiner configured to combine the plurality of encoded analog signals into a single encoded analog composite signal;
    a plurality of analog-to-digital converters configured to sample the same single encoded analog composite signal and generate a plurality of digital composite signals representative of the single encoded analog composite signal, wherein the plurality of analog-to-digital converters operates at a sampling rate lower than the code rate $F_c$; and
    a plurality of signal decoders configured to decode each of the plurality of digital composite signals, based on the coding scheme, to output a plurality of digital signals containing the desired information content of the received plurality of analog signals.

2. The receiver of claim 1, further comprising at least one spread code generator operative to generate the coding scheme and supplying the code scheme to the plurality of signal encoders and the plurality of signal decoders.

3. The receiver of claim 1, wherein the coding scheme is a set of orthogonal codes.

4. The receiver architecture of claim 1, wherein the set of orthogonal codes is a set of Hadamard orthogonal codes.

5. The receiver of claim 1, wherein the plurality of analog-to-digital converters are based on delta-sigma modulators.

6. The receiver of claim 1, wherein the plurality of analog-to-digital converters further comprising a noise transfer function generator to shape the quantization noise.

7. The receiver of claim 1, wherein the plurality of analog-to-digital converters operates to sample the single encoded analog composite signal at a sampling rate of $$\frac{F_c}{n},$$

wherein $F_c$ is the code rate and n is number of codes in the coding scheme.

8. The receiver of claim 1, further comprising a multi-phase clock generator operative to generate a plurality of phase-shifted clocks and supplying the phase-shifted clocks to plurality of analog-to-digital converters.

9. The receiver of claim 8, wherein the plurality of analog-to-digital converters operates at a clock frequency of $$\frac{F_c}{n} + k\frac{2\pi}{n}$$

wherein $F_c$ is the code rate, n is number of codes in the coding scheme and k ranges from 0 to n−1.

10. The receiver of claim 1, wherein the plurality of signal decoders decodes the plurality of digital composite signals in an interleaved manner.

11. A method of processing wireless received signals, comprising:

receiving a plurality of analog signals containing desired information content;

encoding the plurality of received analog signals into a plurality of encoded analog signals in accordance with a coding scheme having a code rate $F_c$;

combining the plurality of encoded analog signals into a single encoded analog composite signal;

sampling the single encoded analog composite signal to generate a plurality of digital composite signals representative of the single encoded analog composite signal, wherein the sampling rate is lower than the code rate $F_c$; and decoding the plurality of digital composite signals in accordance with the coding scheme to output a plurality of digital signals containing the desired information content of the received plurality of analog signals.

12. The method of claim 11, further comprising generating a coding scheme.

13. The method of claim 11, wherein the coding scheme is a set of orthogonal codes.

14. The method of claim 12, wherein set of orthogonal codes is a set of Hadamard orthogonal codes.

15. The method of claim 11, further comprising a noise transfer function to shape the quantization noise.

16. The method of claim 11, wherein sampling of the single encoded analog composite signal is performed at a sampling rate of $$\frac{F_c}{n},$$

wherein $F_c$ is the code rate and n is number of codes in the coding scheme.

17. The method of claim 11, further comprising a method to generate a plurality of phase-shifted clocks.

18. The method of claim 17, wherein the analog-to-digital conversion is performed at a clock frequency of $$\frac{F_c}{n} + k\frac{2\pi}{n},$$

wherein $F_c$ is the code rate, n is number of codes in the coding scheme and k ranges from 0 to n−1.

19. The method of claim 11, wherein decoding of the plurality of digital composite signals to generate the plurality of digital signals is performed in an interleaving manner.

* * * * *